(12) United States Patent
Johnson et al.

(10) Patent No.: US 6,481,203 B1
(45) Date of Patent: Nov. 19, 2002

(54) ELECTRIC SHIFTING OF A VARIABLE SPEED TRANSMISSION

(75) Inventors: Kevin J. Johnson; Joseph V. Miller, both of Salem; Richard T. Ruebusch, New Albany, all of IN (US)

(73) Assignee: Tecumseh Products Company, Tecumseh, MI (US)

( * ) Notice: Subject to any disclaimer, the term of this patent is extended or adjusted under 35 U.S.C. 154(b) by 9 days.

(21) Appl. No.: 09/587,622

(22) Filed: Jun. 5, 2000

Related U.S. Application Data (60) Provisional application No. 60/138,483, filed on Jun. 10, 1999.

(51) Int. Cl.[7] .................................. F16D 39/00
(52) U.S. Cl. ........................................ 60/487
(58) Field of Search ........................ 60/487; 92/12.2

(56) References Cited

U.S. PATENT DOCUMENTS

| | | | | |
|---|---|---|---|---|
| 1,533,399 A | * | 4/1925 | Dunlap ...................... 60/487 |
| 2,737,895 A | * | 3/1956 | Ferris ........................ 92/12.2 |
| 3,679,156 A | | 7/1972 | Redmond, Jr. ............ 244/77 R |
| 4,188,859 A | | 2/1980 | VanWagenen et al. ........ 91/499 |
| 4,543,786 A | | 10/1985 | Shuler ........................ 60/435 |
| 4,646,870 A | | 3/1987 | Koch et al. .................. 180/336 |
| 4,875,390 A | * | 10/1989 | Hayashi et al. ............... 74/731 |
| 4,916,901 A | | 4/1990 | Hayashi et al. ............... 60/489 |
| 4,924,960 A | | 5/1990 | Crill ............................. 180/333 |
| 5,060,477 A | | 10/1991 | Hayashi et al. ............... 60/488 |
| 5,079,996 A | * | 1/1992 | Abousabha et al. ......... 92/12.2 |
| 5,086,870 A | | 2/1992 | Bolduc ........................ 180/333 |
| 5,108,267 A | | 4/1992 | Horst ........................... 417/218 |
| 5,177,967 A | * | 1/1993 | von Kaler et al. ............ 60/487 |
| 5,182,966 A | | 2/1993 | von Kaler et al. ........ 74/606 R |
| 5,226,349 A | | 7/1993 | Alme et al. ................... 91/506 |
| 5,280,282 A | | 1/1994 | Nagafusa et al. ......... 340/825.5 |
| 5,353,595 A | | 10/1994 | Hayashi et al. ............... 60/489 |
| 5,373,697 A | | 12/1994 | Jolliff et al. .................. 60/454 |
| 5,467,598 A | | 11/1995 | Welscher ...................... 60/436 |
| 5,553,684 A | | 9/1996 | Bolduc ........................ 180/333 |
| 5,575,151 A | | 11/1996 | Hayashi et al. ............... 60/489 |
| 5,630,707 A | | 5/1997 | Kim et al. .................... 417/269 |
| 5,678,405 A | | 10/1997 | Folsom ........................ 60/488 |
| 5,701,738 A | | 12/1997 | Eberle et al. ................. 60/435 |
| 5,860,884 A | | 1/1999 | Jolliff ........................... 475/89 |
| 5,881,629 A | | 3/1999 | Gollner et al. ............... 91/505 |
| 5,971,881 A | | 10/1999 | Jolliff ........................... 475/89 |
| 5,974,798 A | | 11/1999 | Eberle et al. ................. 60/435 |
| 5,992,150 A | | 11/1999 | Eberle ......................... 60/487 |
| 6,010,423 A | | 1/2000 | Jolliff et al. .................. 475/93 |

* cited by examiner

*Primary Examiner*—Edward L. Look
*Assistant Examiner*—Michael Leslie
(74) *Attorney, Agent, or Firm*—Baker & Daniels (57) ABSTRACT

A variable speed transmission including a rotatable input member, a fluid pump operatively engaged with the input member, a fluid in the pump being pumped in response to rotation of the input member, and a fluid motor in fluid communication with the fluid pump, fluid pumped by the pump being received by the fluid motor, the fluid motor being driven by fluid received by the fluid motor and having a variable output speed. Means are provided for selectively varying the displacement of the fluid pump or the fluid motor, whereby the output speed of the fluid motor is varied. A rotatable output member is operatively engaged with the fluid motor, and a reversible electric motor having an output shaft is provided, the output shaft having varying angular positions. The output shaft is in mechanical engagement with the displacement varying means, and the displacement of the one of the fluid pump and the fluid motor being varied in response to changes in the output shaft angular position.

9 Claims, 7 Drawing Sheets

FIG_10

ELECTRIC SHIFTING OF A VARIABLE SPEED TRANSMISSION

CROSS-REFERENCE TO RELATED APPLICATION

This application is related to and claims the benefit under 35 U.S.C. §119(e) of U.S. Provisional Patent application Ser. No. 60/138,483, filed Jun. 10, 1999.

BACKGROUND OF THE INVENTION

The present invention relates to hydrostatic transmissions and transaxies having fluid pumps of adjustable displacement, and particularly to means for adjusting the pump displacement to control the output speed and direction of an output shaft or axle; the present invention also relates to fluid controlled mechanically-driven transmissions and transaxles having epicyclic gearing, the speed of rotation of the gears varied in response to resistance to a fluid flow through a pump coupled thereto, and particularly to means for adjusting the resistance to the fluid flow through the pump to control the output speed of an output shaft or axle.

Typically, hydrostatic transmissions transmit rotary mechanical motion, typically from an internal combustion engine, to fluid motion, typically oil, and then back to rotary mechanical motion to rotate a pair of drive axles in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of the radial piston design, for example, and motor formed as a gear pump. The speed of the output of the transmission is typically controlled by varying the eccentricity of the pump track ring or swash plate, thereby varying the displacement of the pump.

U.S. Pat. No. 5,177,967, issued Jan. 12, 1993; U.S. Pat. No. 5,182,966, issued Feb. 2, 1993; U.S. Pat. No. 5,373,697, issued Dec. 20, 1994; U.S. Pat. No. 5,701,738, issued Dec. 30, 1997; U.S. Pat. No. 5,974,798, issued Nov. 2, 1999; and U.S. Pat. No. 5,992,150, issued Nov. 30, 1999; and U.S. patent application Ser. No. 09/302,312, filed Apr. 29, 1999, the disclosures of which are all expressly incorporated herein by reference, disclose hydrostatic transmissions comprising radial piston pumps and motors.

U.S. patent application Ser. No. 09/498,692, filed Feb. 7, 2000, the disclosure of which is expressly incorporated herein by reference, discloses a hydrostatic transmission comprising an axial piston pump and motor of the swashplate or wobbleplate type.

Some types of mechanically-driven transmissions couple an input shaft to an output shaft or axle through an epicyclic gear train. The input-to-output speed of the epicyclic gear train may be varied by restricting the rotation of a ring gear which is intermeshed with a plurality of planet gears, which are in turn meshed with a sun gear. If the ring gear is free to rotate, the planet gears will not tend to revolve about the rotating sun gear. If the ring gear's rotation is partly or fully restricted, the planet gears will tend to revolve about the sun gear at a speed inversely corresponding to the ring gear's rotation.

U.S. Pat. No. 5,860,884, issued Jan. 19, 1999; U.S. Pat. No. 5,971,881, issued Oct. 26, 1999; and U.S. Pat. No. 6,010,423, issued Jan. 4, 2000, the disclosures of which are all expressly incorporated herein by reference, disclose fluid controlled mechanically-driven transmissions having epicyclic gearing comprising a ring gear, the outer periphery of which forms an inner member of a gerotor pump. The inner gerotor pump member is meshed with a rotatable outer gerotor pump member. Fluid flow from the gerotor pump is regulated by a linearly traveling valve. The speed of rotation of the output shaft coupled to the epicyclic gearing corresponds to the amount of resistance to a fluid flow through the gerotor pump. Those skilled in the art will recognize that a gear pump may be used in lieu of a gerotor pump. The valve may be of the type which is manually operated.

A problem associated with hydrostatic transmissions or fluid pump-controlled mechanically-driven transmissions described above and disclosed in the above-mentioned, expressly incorporated references, is that the mechanical linkages used for varying the displacement of the pump in a hydrostatic pump, or for varying the fluid flow restriction from the gerotor pump of the fluid controlled mechanically-driven transmission, are imprecise and may require actuation force levels which are undesirably high for some operators. A means of more precisely setting the transmission speed, with less required effort, is highly desirable.

SUMMARY OF THE INVENTION

The present invention provides a variable speed transmission including a rotatable input member, a fluid pump operatively engaged with the input member, a fluid in the pump being pumped in response to rotation of the input member, and a fluid motor in fluid communication with the fluid pump, fluid pumped by the pump being received by the fluid motor, the fluid motor being driven by fluid received by the fluid motor and having a variable output speed. Means are provided for selectively varying the displacement of the fluid pump or the fluid motor, whereby the output speed of the fluid motor is varied. A rotatable output member is operatively engaged with the fluid motor, and a reversible electric motor having an output shaft is provided, the output shaft having varying angular positions. The output shaft is in mechanical engagement with the displacement varying means, and the displacement of the one of the fluid pump and the fluid motor being varied in response to changes in the output shaft angular position.

In certain embodiments of the present invention, a rotatably adjustable electric motor, such as a servomotor or stepper motor, is provided which has a gear attached to the motor shaft and is in meshed engagement with a gear attached to a pivoting swashplate of an axial piston fluid pump in a hydrostatic transmission, whereby the displacement of the pump is variably controlled by adjustment of the motor shaft, thereby controlling the speed and/or direction of an output shaft of the transmission.

In certain other embodiments of the present invention, a rotatably adjustable electric motor, such as a servomotor or stepper motor, is provided which has a gear attached to the motor shaft and is in meshed engagement with a gear attached to a pivoting track ring of a rotary piston fluid pump in a hydrostatic transmission, whereby the displacement of the pump is variably controlled by adjustment of the motor shaft, thereby controlling the speed and/or direction of an output shaft of the transmission.

The present invention also provides a variable speed transmission assembly including a rotatable input member connectable to a drive source, a rotatable output member, and a gear train operatively connected to the input member and the output member for transmitting rotational power of the input member to the output member, the gear train including an epicyclic gear mechanism including a first gear member. A pump is provided for pumping a fluid through a fluid conduit, the pump including a first element and a second element, the first and second pump elements each disposed in a fluid engaging position within the fluid conduit, wherein the first pump element comprises the first gear member and the first pump element is disposed within the second element. An adjustable valve is provided for varying a resistance to movement of fluid within the fluid conduit between a first resistance level and a second resistance level, and a reversible electric motor having an output shaft, the output shaft having varying angular positions, is in mechanical engagement with the valve, the resistance to movement of fluid within the fluid conduit being varied in response to changes in the output shaft angular position. The first gear member revolves at a first speed to cause rotation of the output member at a first rate when the resistance to fluid movement within the fluid conduit is at the first resistance level and the input member rotates at a drive speed, and the first gear member revolves at a second speed to cause rotation of the output member at a second rate when the resistance to fluid movement within the fluid conduit is at the second resistance level and the input member rotates at the drive speed.

In certain embodiments of the present invention, a rotatably adjustable electric motor, such as a servomotor or stepper motor, is provided which has a gear attached to the motor shaft and in meshed engagement with a gear attached to an axially-movable control rod of an outlet valve of a pump connected to an epicyclic gear train in a fluid-controlled mechanically-driven transmission, whereby the fluid flow restriction from the pump is variably controlled by adjustment of the motor shaft, thereby controlling the speed of an output shaft of the transmission.

DETAILED DESCRIPTION

Figure 1:
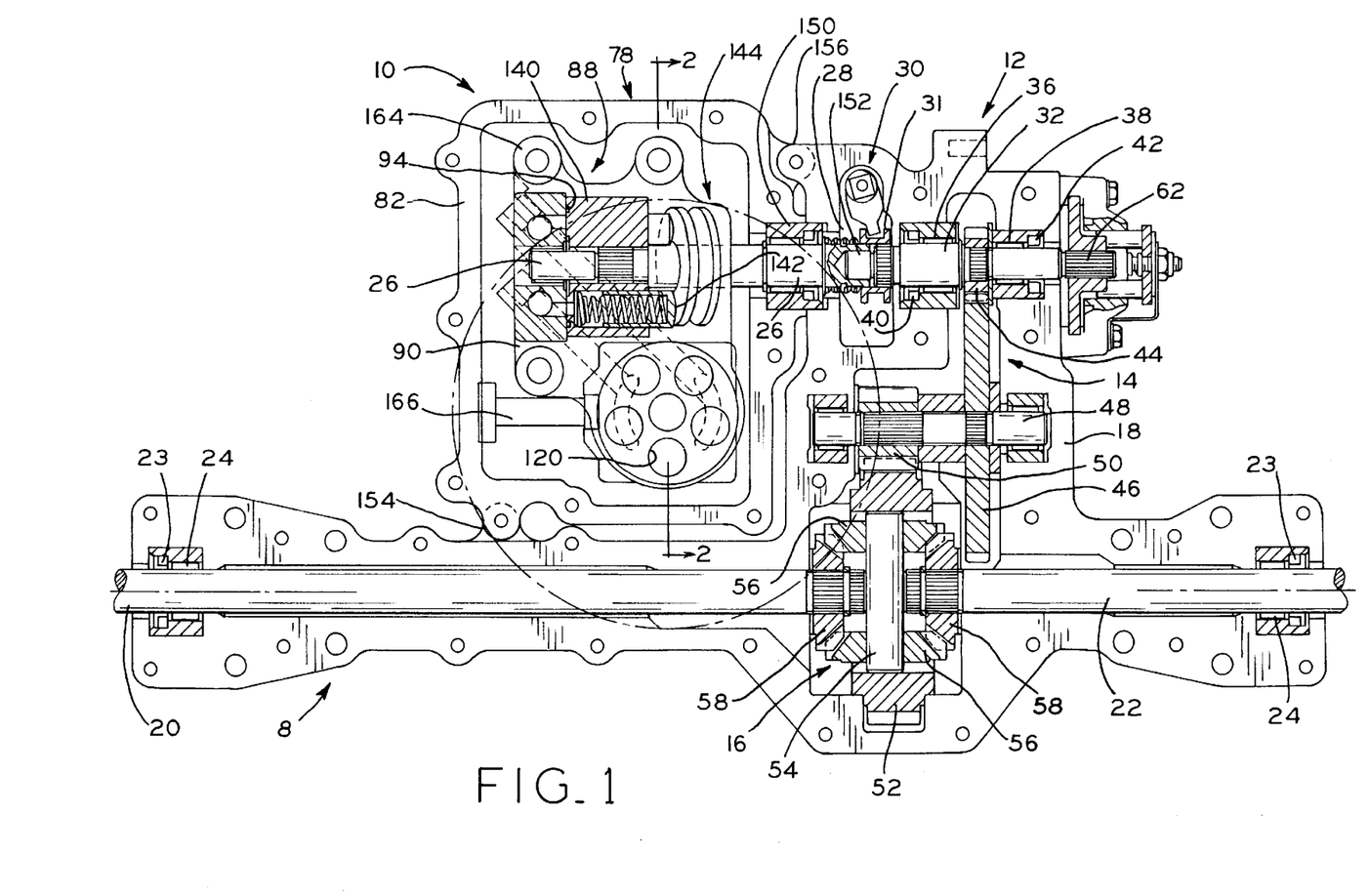
FIG. 1 is a sectional view of an embodiment of a hydrostatic transaxle according to the present invention, taken along a horizontal plane intersecting the axis of the axle.

Referring first to FIG. 1, transaxle 8 comprises a hydrostatic transmission 10 and an axle mechanism 12, the latter including reduction gear train 14 and differential mechanism 16. Axle mechanism 12 includes a casing 18 formed of upper and lower halves, only one of which is shown, wherein the casing halves 18 are split along a horizontal plane coincident with the axes of axles 20 and 22. Axles 20 and 22 extend outwardly from differential 16 through openings in the ends of casing 18, which is sealed by means of seals 23, and wherein axles 20 and 22 are supported by bearings 24.

The output shaft 26 from the motor 138 of hydrostatic transmission 10 extends into a space 28 which carries a mechanical disconnect mechanism 30 of the type disclosed in U.S. Pat. No. 5,701,738, issued Dec. 30, 1997, the disclosure of which is expressly incorporated herein by reference. The disconnect mechanism 30 comprises a splined sleeve 31 that is moved axially to connect and disconnect shafts 26 and 32. Output shaft 62 is piloted around gear train input shaft 32, which is supported by bearings 36 and 38. Shaft 32 is sealed by seals 40 and 42. Splined to shaft 32 is pinion gear 44, which is in intermeshing engagement with gear 46 splined to countershaft 48. Pinion 50, which is also splined to countershaft 48, engages ring gear 52 of differential 16. Differential 16 comprises pin 54 that carries bevel gears 56 and further comprises bevel gears 58 splined to axles 20 and 22.

Reduction gear train 14 reduces the rotational speed of output shaft 32 and transmits the rotational motion to differential 16, which rotates axles 20 and 22 in a known manner. Axle casing 18 is filled with an appropriate lubricating oil or grease, and the entire casing is sealed from the ambient by seals 40, 42 and 23.

Figure 2:
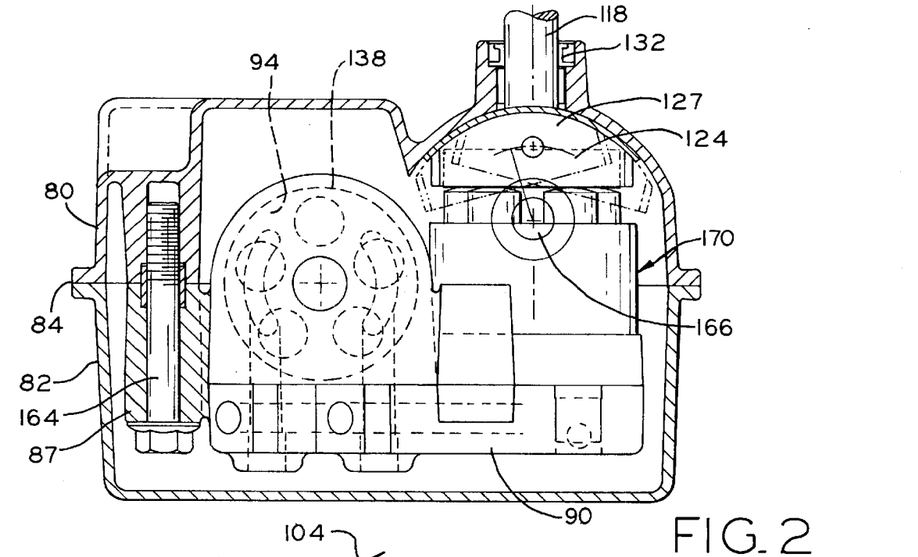
FIG. 2 is a sectional view of the hydrostatic transaxle of FIG. 1, taken along line 2—2.
Figure 5:
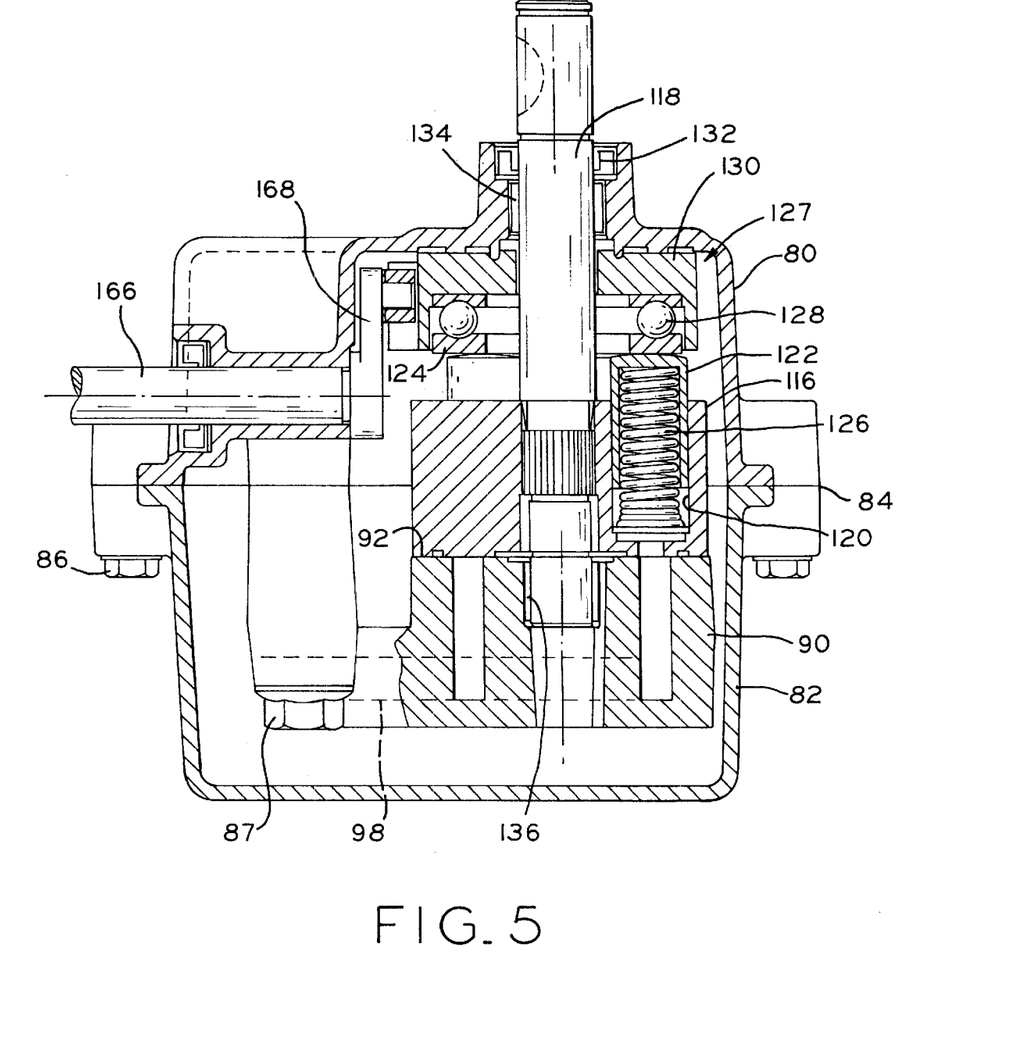
FIG. 5 is an enlarged sectional view of the pump.
Figure 6:
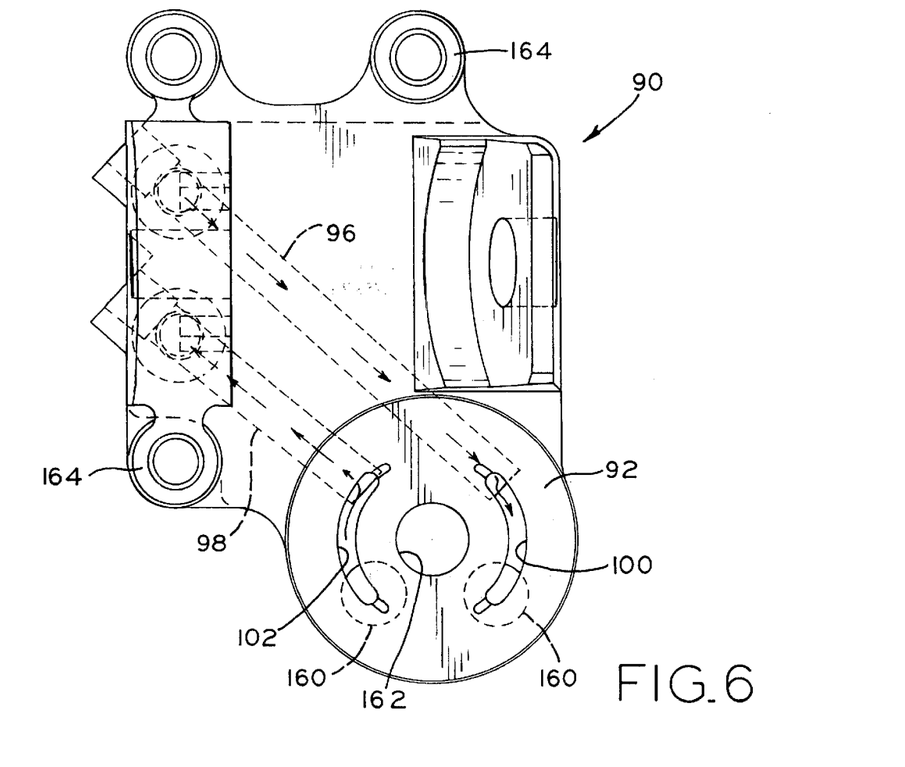
FIG. 6 is a plan view of the center section for the hydrostatic transmission.
Figure 7:
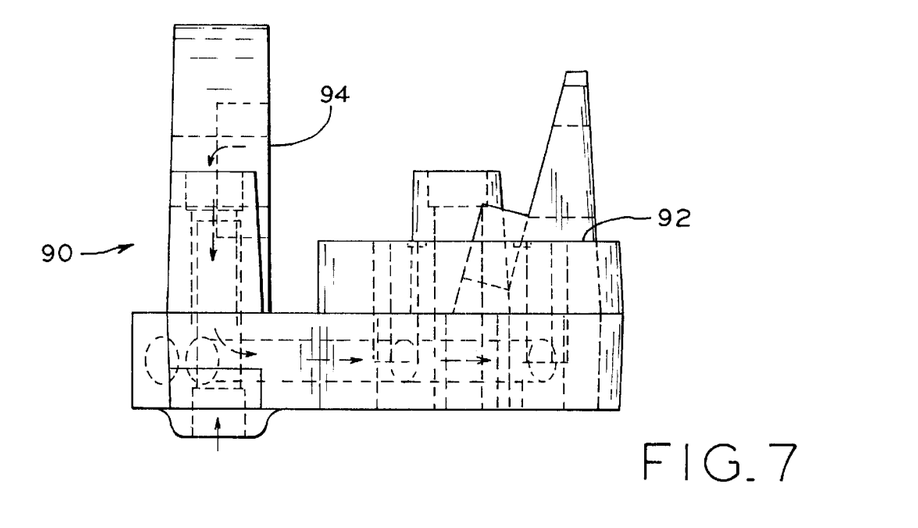
FIG. 7 is an elevational view of the center section.
Figure 8:
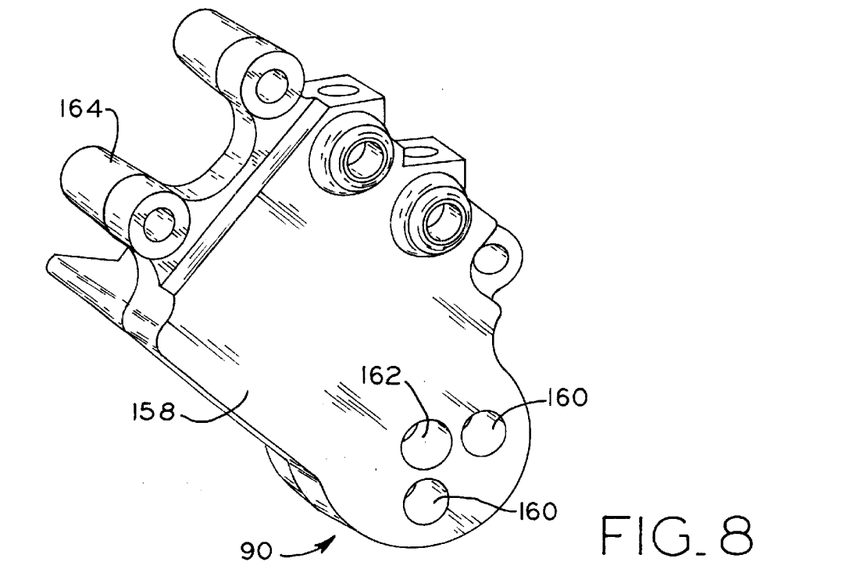
FIG. 8 is a perspective view of the center section viewed from the bottom.
Figure 9:
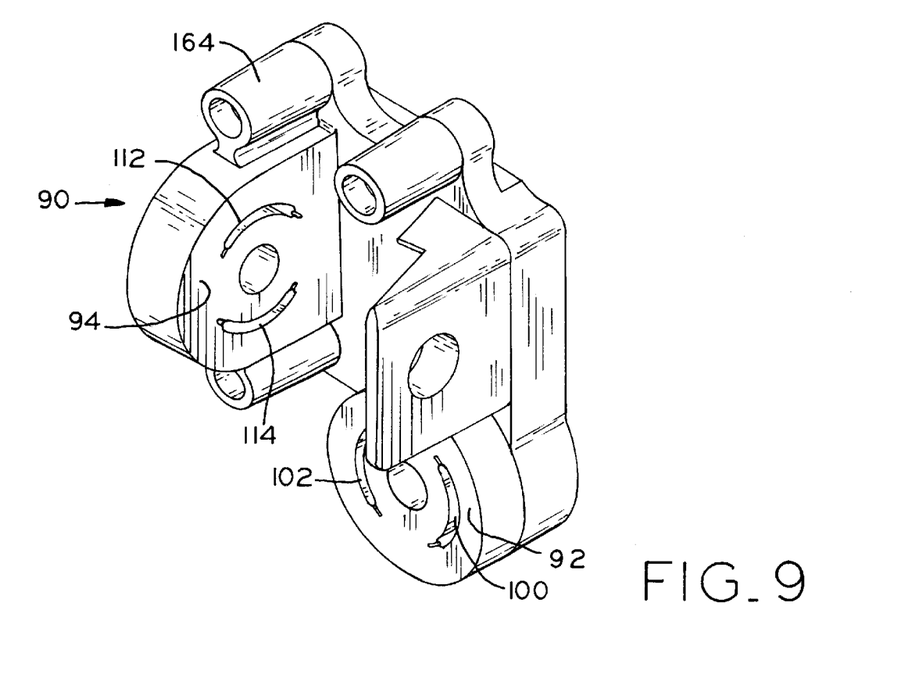
FIG. 9 is a perspective view of the center section viewed from the top.

Referring to FIGS. 2 and 5, hydrostatic transmission 10 comprises a separate, self-contained casing 78 having two casing halves 80 and 82 split along a horizontal interface 84 that is coplanar with the axis of motor output shaft 26. Casing halves 80 and 82 are connected together by means of a plurality of screws 86 that extend through the lower casing half 82 and are threadedly received in bores in the upper casing half 80. Disposed within casing 78 is a hydrostatic pump and motor mechanism 88 comprising center section 90 having a pump mounting surface 92 (FIG. 5) and a motor mounting surface 94 (FIG. 9) and internal passages 96 and 98 (FIG. 6) hydraulically connecting arcuate slots 100 and 102 in pump face 92 with arcuate slots 112 and 114, respectively, in motor mounting face 94 (FIG. 9). In the depicted embodiment, the pump and motor are both of the axial piston, swashplate or wobbleplate type. As mentioned above, the present invention relates to the control of the displacement of the pump; the pump and motor arrangement need not be as shown.

Figure 3:
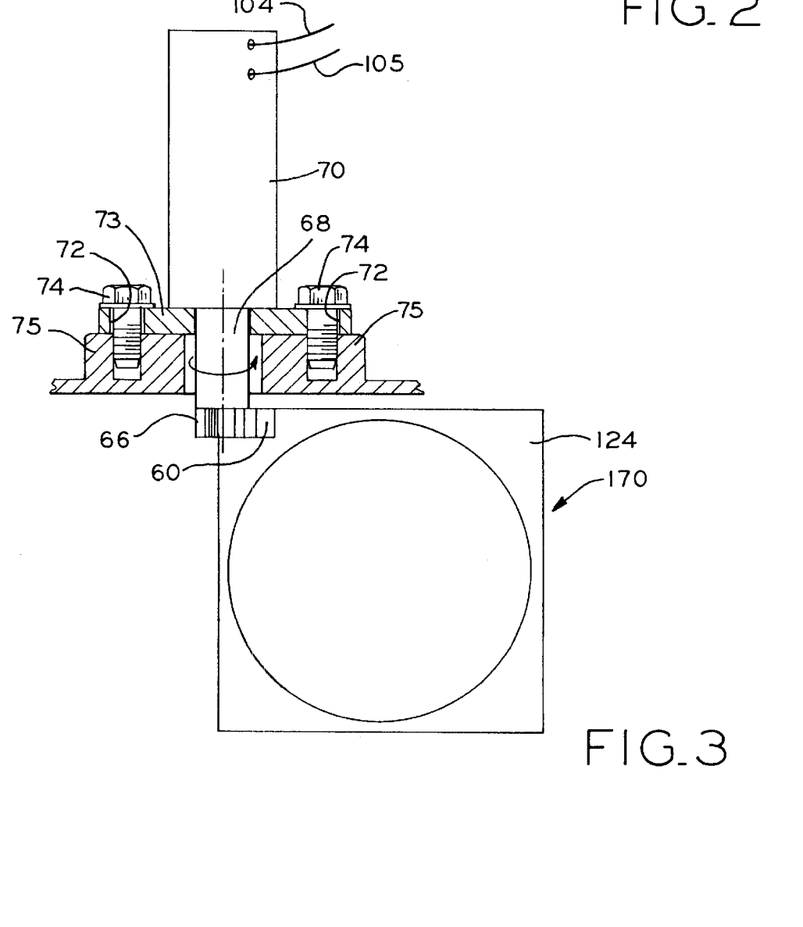
FIG. 3 is a fragmentary top sectional view of the hydrostatic transaxle of FIG. 1.
Figure 4:
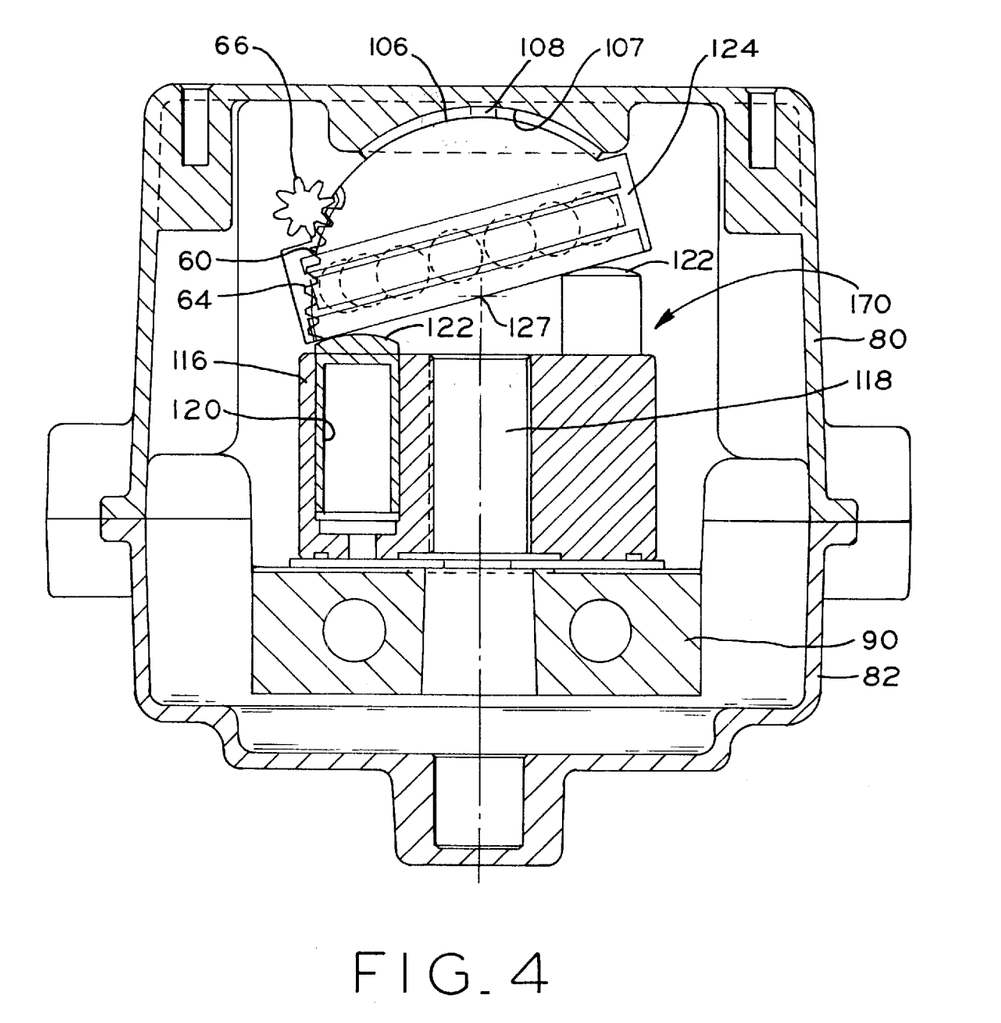
FIG. 4 is a sectional view of the hydrostatic transaxle of FIG. 1, showing the pump.

Referring now to FIGS. 2 and 4, in the known manner, swashplate 124 of pump 170 pivots about pivot point 127, which may be a pin which extends through the swashplate. Swashplate 124, as shown in FIGS. 3 and 4, is provided with arcuate rack 60 having teeth 64. Teeth 64 are intermeshed with spur gear 66 which is attached to reversibly rotatable shaft 68 driven by motor 70. Motor 70 may be a servomotor or a stepper motor. Stepper motors are open-loop devices, i.e., no shaft position feedback to a controller is required to control the motor. In contrast, servomotors rotate continuously, rather than in steps, and require a feedback control loop to proportion the shaft angle to a drive signal. Actuation of motor 70 pivotally drives swashplate 124 to a position corresponding to a particular pump displacement. A motor control interface (not shown) is provided on the implement (e.g., tractor, snow thrower) into which the transmission or transaxle is installed.

Gear 66 is mounted tight against rack 60 such that there is no backlash. This is accomplished, in part, by providing a small clearance between holes 72 in motor mounting plate 73 and bolts 74, which are threaded into bosses 75 provided in the transmission casing. The location of bosses 75 relative to pump 170 are also closely toleranced. The lack of backlash enables the transmission to be shifted into its neutral position, wherein the swashplate is substantially lying in a plane normal to the rotational axis of the pump, the pump there having effectively no displacement. As shown in FIG. 4, a 206 degree rotation of motor shaft 68 provides a 30 degree rotation of swashplate 124 about pivot point 127.

As shown in FIG. 3, motor 70 is in electrical communication to an electrical power source (not shown) via wires 104, 105. The source of electrical power may be, for example, the unregulated 12V battery source of the implement into which the transmission or transaxle is installed. As stated above, motor 70 may be integrated into an open loop control system, wherein motor 70 may be a stepper motor; or motor 70 may be integrated into a closed loop control system, wherein motor 70 may be a servomotor and the position of shaft 68 or the motor rotor is sensed and fed back to the controller. Stepper motor and servomotor technology is well known in the art, and the details of their operation are thus not detailed herein. Notably, motor operation can utilized pulse or digital rotary encoding.

Referring to FIG. 5, in the present embodiment, pump cylinder 116 is rotatably driven by means of input shaft 118 and includes a plurality of cylinders 120 in which are disposed pistons 122 urged against the face of swash plate 124 by means of springs 126. Other embodiments of hydrostatic transmissions which incorporate the inventive control means may drive the pump cylinder by a shaft which approaches the pump cylinder from a side opposite that on which swashplate 124 is located; in such an embodiment, input shaft would not extend through the swashplate. FIG. 4 shows, in part, an example of such an orientation. There, swashplate 124 may include curved surface 106 which interfaces surface 107 of the casing. Interfacing bearing material 108 located therebetween to facilitate smooth, easy movement therebetween and maintain the proper alignment of swashplate 124 to cylinder 116 and to gear 66.

The swash plate assembly may includes bearings 128 and bearing housing 130. Shaft 118 is sealed by means of seal 132 and rotatably supported by bearings 134. Note that pump shaft 118 extends through swash plate assembly 127 and is splined to pump cylinder 1 16. The distal end of shaft 118 is supported by bearing 136 in center section 90. Screws 87 connect center section 90 to upper casing half 80.

Referring now to FIGS. 1 and 2, axial piston motor 138 comprises a rotatable cylinder 140 having a plurality of pistons 142 therein that rotate against fixed swash plate assembly 144, wherein cylinder 140 is mounted on the face 94 (FIG. 9) of center section 90. Motor output shaft 26 extends through cylinder 140 and is supported by means of bearings in center section 90. The axis of output shaft 26 is horizontal and oriented 90° relative to pump input shaft 118. Motor output shaft 26 is supported by means of sleeve and bearing assembly 150 that is press fit to casing 78 and extends into a recess in axle casing 18, but there is clearance provided between sleeve 150 and the recess of axle casing 18. Piloting of transmission 10 with gear train 14 is accomplished by means of a reduced end 152 of gearing input shaft 32 being received within a bore in the end of motor output shaft 26. Because transmission casing 78 is not directly piloted to axle casing 18, binding of shafts 26 and 32 is avoided. Casing 78 is mounted to casing 18 at two locations 154 and 156 by means of overlapping extensions on casings 78 and 18 and bolts that fasten from the bottom. These mounting points resist the rotational torque between transmission 10 and gear mechanism 12.

Referring now to FIGS. 5–9, the lower surface 158 of center section 90 is provided with a pair of openings 160 to provide makeup oil to pump 116, and a filter and checkvalves will be provided, as is customary. Pump shaft 118 is received within bore 162. Integral bosses 164 of center section 90 accommodate and provide support for the mounting screws 87. Blind drilled passageways will be sealed by plugs as is customery in the art.

Figure 10:
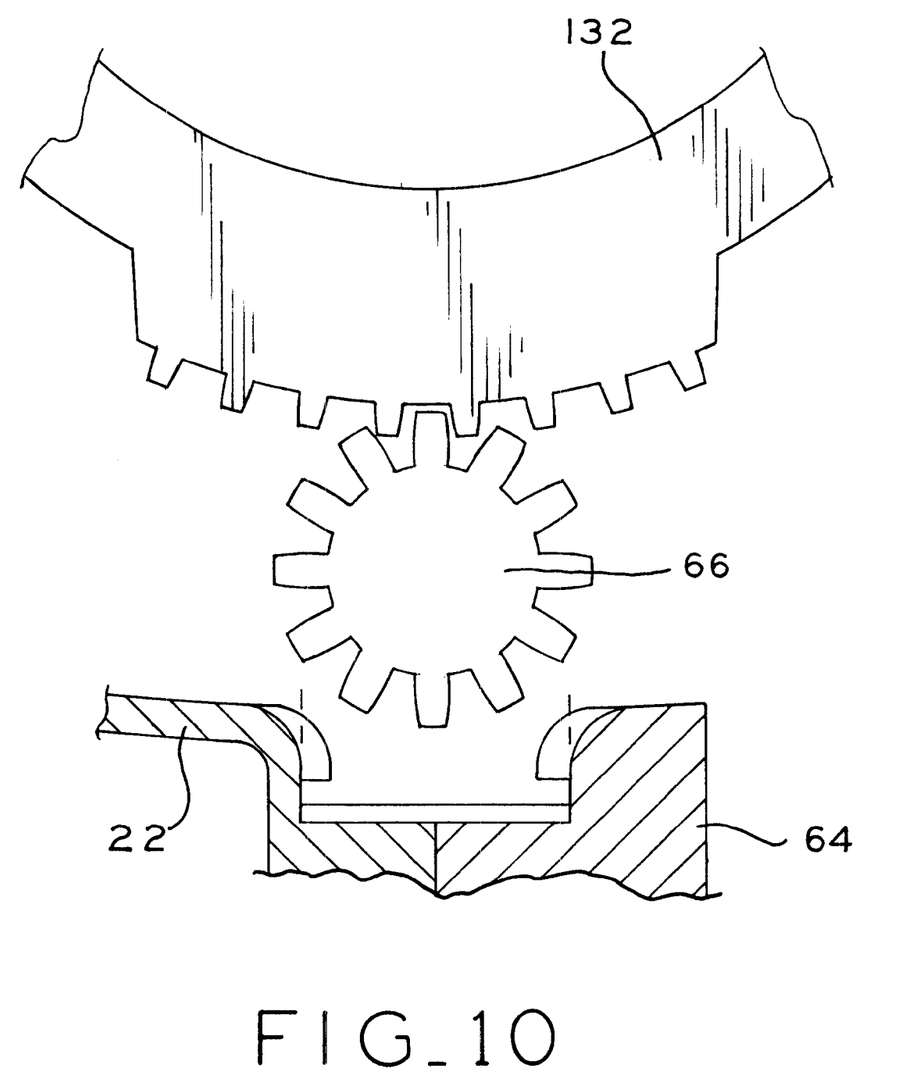
FIG. 10 is an enlarged fragmentary view of the transaxle shown in FIG. 5 of U.S. Pat. No. 5,177,967 modified in accordance with the present invention.

Referring now to a rotary piston type hydrostatic transmission, of the type shown in, for example, abovementioned U.S. Pat. No. 5,177,967, those skilled in the art will now recognize that motor 70 may be similarly adapted to control the pivotal location of track ring 132 (FIG. 5 of the incorporated '967 patent reference). In such an application, motor 70 may, as described above, be a stepper motor or a servomotor having a gear such as gear 66 which engages a circumferentially located arcuate rack or partial ring gear placed on track ring 132 as shown in FIG. 10.

Turning now to a fluid-controlled mechanically-driven transmission, of the type shown in, for example, abovementioned U.S. Pat. No. 5,860,884, those skilled in the art will now recognize that motor 70 may be similarly adapted to control the axial movement of control rod 344 (FIG. 12 of the incorporated '884 patent reference). In such an application, motor 70 may, as described above, be a stepper motor or a servomotor having a gear such as gear 66 which engages an axially oriented gear rack placed on the control rod.

While this invention has been described as having a various embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A variable speed transmission comprising:
   a rotatable input member;
   a fluid pump operatively engaged with said input member, a fluid in said pump being pumped in response to rotation of said input member;
   a fluid motor in fluid communication with but not rotatably fixed to said fluid pump, fluid pumped by said pump being received by said fluid motor, said fluid motor being driven solely by fluid being received from said fluid pump by said fluid motor and having a variable output speed;
   means for selectively varying the displacement of one of said fluid pump and said fluid motor, whereby said output speed of said fluid motor is varied;
   a rotatable output member operatively engaged with said fluid motor; and
   a reversible electric motor having an output shaft, said output shaft having varying angular positions, said output shaft in mechanical engagement with said displacement varying means, the displacement of said one of said fluid pump and said fluid motor being varied in response to changes in said output shaft angular position.

2. The variable speed transmission of claim 1, wherein said transmission is a transaxle and said rotatable output member is an axle.

3. The variable speed transmission of claim 1, wherein said one of said fluid pump and said fluid motor comprises a plurality of displaceable, axially extending pistons; and said displacement varying means comprises a swashplate against which said pistons bear, said swashplate having a plurality of angular positions, the displacement of said one of said fluid pump and said fluid motor being varied in response to changes in the angular position of said swashplate.

4. The variable speed transmission of claim 3, wherein said electric motor output shaft is provided with a gear, and said swashplate is provided with a rack, said gear and said rack being in meshed engagement, whereby rotation of said output shaft induces a change in the angular position of said swashplate.

5. The variable speed transmission of claim 4, further comprising means for providing no backlash between said gear and said rack.

6. The variable speed transmission of claim 1, wherein said electric motor is a stepper motor.

7. The variable speed transmission of claim 1, wherein said electric motor is a servomotor.

8. The variable speed transmission of claim 1, wherein said one of said fluid pump and said fluid motor comprises a plurality of displaceable, radially extending pistons; and said displacement varying means comprises a track ring radially surrounding said pistons and having a plurality of angular positions, the displacement of said one of said fluid pump and said fluid motor being varied in response to changes in the angular position of said track ring.

9. The variable speed transmission of claim 8, wherein said electric motor output shaft is provided with a gear, and said track ring is provided with a rack, said gear and said rack being in meshed engagement, whereby rotation of said output shaft induces a change in the angular position of said track ring.

\* \* \* \* \*

UNITED STATES PATENT AND TRADEMARK OFFICE
CERTIFICATE OF CORRECTION

PATENT NO. : 6,481,203 B1
DATED : November 19, 2002
INVENTOR(S) : Kevin L. Johnson et al.

It is certified that error appears in the above-identified patent and that said Letters Patent is hereby corrected as shown below:

<u>Title page,</u>
Item [75], please change the first inventor's name from "Kevin J. Johson" to
-- Kevin L. Johnson --

Signed and Sealed this

Fourth Day of March, 2003

JAMES E. ROGAN
*Director of the United States Patent and Trademark Office*